(12) United States Patent
Fulara et al.

(10) Patent No.: US 9,169,077 B2
(45) Date of Patent: Oct. 27, 2015

(54) APPARATUS FOR THE PASSAGE AND CONVEYANCE OF COMPRESSIBLE MATERIAL

(75) Inventors: Janusz Krzysztof Fulara, Kallaroo (AU); Ryszard Stanislaw Rudas, Darlington (AU); Maciej Rafal Rudas, Darlington (AU); Martin Richard Gravett, Salisbury (AU)

(73) Assignee: ANAECO LIMITED, Bentley (AU)

( * ) Notice: Subject to any disclaimer, the term of this patent is extended or adjusted under 35 U.S.C. 154(b) by 25 days.

(21) Appl. No.: 14/240,631

(22) PCT Filed: Sep. 6, 2012

(86) PCT No.: PCT/AU2012/001056
§ 371 (c)(1),
(2), (4) Date: May 16, 2014

(87) PCT Pub. No.: WO2013/033771
PCT Pub. Date: Mar. 14, 2013

(65) Prior Publication Data
US 2014/0246291 A1    Sep. 4, 2014

(30) Foreign Application Priority Data

Sep. 6, 2011 (AU) .............................. 2011903627

(51) Int. Cl.
*B65G 33/08* (2006.01)
*B65G 65/46* (2006.01)
(Continued)

(52) U.S. Cl.
CPC ............. *B65G 33/08* (2013.01); *B65G 33/265* (2013.01); *B65G 65/46* (2013.01); *C02F 11/125* (2013.01); *B65G 2201/04* (2013.01); *B65G 2812/0594* (2013.01)

(58) Field of Classification Search
CPC .... B65G 47/52; B65G 2201/04; B65G 65/46; B65G 33/08; B65G 33/265; B65G 2812/0594; C02F 11/125
USPC ..................... 198/545, 548, 550.6, 550.1, 663
See application file for complete search history.

(56) References Cited

U.S. PATENT DOCUMENTS 1,463,379 A * 7/1923 Strandlund .................... 172/402
2,778,482 A * 1/1957 Lasch et al. .................... 198/560
(Continued)

FOREIGN PATENT DOCUMENTS

CN     201010339 Y    1/2008
CN     201292165 Y    8/2009
(Continued)

OTHER PUBLICATIONS

Supplementary European Search Report issued in European Patent Application No. 12830081.1 on May 7, 2015, 6 pages.
(Continued)

*Primary Examiner* — Mark A Deuble
(74) *Attorney, Agent, or Firm* — Rothwell, Figg, Ernst & Manbeck, P.C.

(57) ABSTRACT

An apparatus (10) for the passage and conveyance of compressible material, the apparatus (10) comprising at least two arrays (14) of substantially parallel first screw conveyors (16) each arranged at an outlet (56) of a vessel (12) from which the material is to be conveyed such that the material is conveyed to respective second screw conveyors (18) arranged in generally transverse relation thereto, wherein the material to be conveyed bears directly on the first screw conveyors (16) from above and does not bear directly on the second screw conveyors (18). A method for the passage and conveyance of compressible material is also described.

27 Claims, 5 Drawing Sheets

(51) Int. Cl.
 *B65G 33/26* (2006.01)
 *C02F 11/12* (2006.01)

(56) References Cited

U.S. PATENT DOCUMENTS

| | | | | |
|---|---|---|---|---|
| 3,549,000 | A | * | 12/1970 | Christian et al. .............. 198/659 |
| 3,785,512 | A | * | 1/1974 | Gatz et al. ..................... 414/326 |
| 3,938,434 | A | * | 2/1976 | Cox ............................... 100/117 |
| 4,593,612 | A | | 6/1986 | Rieger |
| 4,685,628 | A | | 8/1987 | Berrett |
| 5,351,899 | A | | 10/1994 | Koenig |
| 6,609,638 | B1 | | 8/2003 | Lott |
| 2004/0244932 | A1 | * | 12/2004 | Forslund et al. .............. 162/236 |
| 2005/0121469 | A1 | | 6/2005 | Landers et al. |
| 2012/0195721 | A1 | * | 8/2012 | Burke et al. .................. 414/287 |

FOREIGN PATENT DOCUMENTS

| | | |
|---|---|---|
| CN | 201706870 U | 1/2011 |
| CN | 201793556 U | 4/2011 |
| FR | 2354293 A2 | 1/1978 |
| FR | 2547282 A1 | 12/1984 |
| JP | 60-77034 A | 5/1985 |
| WO | 2009/034442 A2 | 3/2009 |

OTHER PUBLICATIONS

Office Action issued in Chinese Patent Application No. 201280053443.6 on Jun. 3, 2015 along with English translation, 26 pages.

Extended European Search Report issued in European Patent Application No. 12830081.1 on Aug. 25, 2015, 9 pages.

* cited by examiner

APPARATUS FOR THE PASSAGE AND CONVEYANCE OF COMPRESSIBLE MATERIAL

CROSS REFERENCE TO RELATED APPLICATIONS

This application is a 35 U.S.C. §371 National Phase Entry Application from PCT/AU2012/001056, filed Sep. 6, 2012, and designating the United States, which claims priority under 35 U.S.C. §119 to Australian Provisional Patent Application No. 2011903627 filed Sep. 6, 2011, which is incorporated herein in its entirety.

FIELD OF THE INVENTION

The present invention relates to an apparatus and method for the passage and conveyance of compressible material. More particularly, the apparatus and method of the present invention are intended to facilitate the smooth passage of materials being discharged therefrom.

BACKGROUND ART

Traditionally, the discharge of compressible material from any of a, reactor, storage vessel, or container, by way of a 'live bottom' reclaim screw conveyor, is problematic due to the manner in which the material within the reactor or vessel bears directly on that screw conveyor, causing choking. Material flow blockages are common, as is the stalling of the reclaim and discharge screw conveyors that results from high current draws caused in turn by the load on the screw conveyor. Such 'live bottom' reclaim screw conveyors of the prior art comprise a single array of screw conveyors that span the full width of the material outlet.

The nature of the compressible material that is being discharged has a significant impact on the ease or otherwise with which that material may be discharged. For example, if the compressible material is additionally fibrous, or 'stringy', this adds to handling difficulties.

In International Patent Application PCT/AU00/00865 (WO 01/05729) there is described a process for the treatment of organic waste in which that organic waste is subjected to sequential periods of anaerobic digestion and aerobic composting, in a single vessel or reactor, as a batch process. At the end of the process it is necessary to discharge the material from the reactor so that the next batch of organic material can be introduced to the reactor. The passage and conveyance of the processed material has proven problematic when attempted by way of traditional arrangement of a live bottom screw conveyor. The processed material produced by this process has been found to be particularly fibrous, or 'stringy', and is consequently difficult to convey. Further, this processed material contains significant quantities of water, adding to the difficulty in efficient conveying of the material. Significant load is placed on the screw conveyors as the material to be conveyed impinges on them, in turn placing significant load on the motors and gearboxes employed in driving them. Further, as there is a significant tendency for the material being conveyed to 'choke' the screw conveyors this adds to the loads referred to immediately above.

Publication CN 201010339 (Changsha Design & Res Inst) describes a method and apparatus for conveying material from a hopper. A set of first screws are employed to push material across an outlet aperture of the hopper to a lower discharge transverse screw. This arrangement does not overcome the problems associated with live bottom screw conveyors as the material being conveyed bears directly on the set of first screws that extend across the full width of the hopper and convey material in a single direction. The design of the hopper provided to feed material to the screws makes no contribution to the reduction of the force and pressure the material brings to bear on the screws, placing significant load on the first screws and the single motor driving them. No mechanism is described for dealing with or reducing the moisture content of the material to be conveyed.

Japanese Publication JP 60-77034 (Asahi Sangyo KK) describes an arrangement for the smooth conveying of objects from a hopper using a "carry-out" screw conveyor, without "bridging phenomena". An arrangement of a single, belt driven and central carry-out screw conveyor with four gear driven "scratching" screw conveyors on either side positioned at the base of the hopper is described. All the screw conveyors are arranged to be parallel. The scratching screw conveyors convey material toward the carry-out screw conveyor which is the only conveyor of the arrangement that actually conveys material from the hopper. Again, this arrangement does not overcome the problems associated with live bottom screw conveyors as the material being conveyed bears directly on the screws that extend across the full width of the hopper and convey material in a single direction. The scratching screw conveyors attempt to direct the material to the single carry-out screw conveyor but this arrangement provides an indirect method of conveying most of the material, requiring it to be first conveyed to the single carry-out screw conveyor. The design of the hopper again makes no contribution to the reduction of force and pressure the material brings to bear on the screws. Again, no mechanism is described for dealing with or reducing the moisture content of the material to be conveyed.

The apparatus of the present invention has as one object thereof to overcome substantially the abovementioned problems of the prior art, or to at least provide a useful alternative thereto.

The preceding discussion of the background art is intended to facilitate an understanding of the present invention only. The discussion is not an acknowledgement or admission that any of the material referred to is or was part of the common general knowledge as at the priority date of the application.

Throughout the specification and claims, unless the context requires otherwise, the word "comprise" or variations such as "comprises" or "comprising", will be understood to imply the inclusion of a stated integer or group of integers but not the exclusion of any other integer or group of integers.

DISCLOSURE OF THE INVENTION

In accordance with the present invention there is provided an apparatus for the passage and conveyance of compressible material, the apparatus comprising at least two arrays of substantially parallel first screw conveyors each arranged at an outlet of a vessel from which the material is to be conveyed such that the material is conveyed to respective second screw conveyors arranged in generally transverse relation thereto, wherein the material to be conveyed bears directly on the first screw conveyors from above and does not bear directly on the second screw conveyors.

Preferably, there are provided two arrays of first screw conveyors arranged to feed material toward the respective second screw conveyors.

Still preferably, the two arrays of first screw conveyors feed material in substantially opposite directions towards the respective second screw conveyors.

The two arrays of first screw conveyors preferably abut at a mid-point of the outlet of the vessel. In this manner both arrays of first screw conveyors are exposed to about half of the material presenting at the outlet of the vessel.

Preferably, the first screw conveyors each comprise a tapered shaft about which is provided a single helical flight, the shaft tapering towards an outer end thereof. The helical flight preferably increases in pitch relative to the shaft as it progresses towards the outer end thereof.

The flight preferably terminates towards a narrower or outer end thereof providing a bare outer portion of the shaft.

Still preferably, a partial flight of reverse orientation is provided about the shaft adjacent the narrower or outer end thereof.

Still further preferably, the first and second screw conveyors are sealed and able to withstand and operate at elevated fluid pressures.

In one form of the present invention the vessel from which the material is to be conveyed has an upper portion of generally cylindrical form and a lower portion that is provided in the form of an inverted cone, whereby material therein is funnelled into the inverted cone and a circular outlet provided at a base thereof.

Preferably, the apparatus for the passage and conveyance of compressible material is provided at the base of the inverted cone of the vessel.

Still preferably, the inverted cone of the lower portion of the vessel is such that an arched or radial stress field is formed therein, thereby reducing the load that may be transferred to the apparatus for the passage and conveyance of compressible material.

Still further preferably, the arched or radial stress field is formed with a radius that centres on an imagined central point of the inverted cone of the lower portion of the vessel.

Preferably, the lower portion of the vessel describes an angle of between about 12 to 20° to the vertical. Still preferably, the angle described by the lower portion of the vessel is about 15° C. to the vertical.

Preferably, the arrays of first screw conveyors are provided in a housing, the housing allowing the material bearing thereon to flow radially into it across the arrays.

In one form of the present invention the second screw conveyors have associated therewith one or more screen means by which the material being conveyed is dewatered.

Preferably, each second screw conveyor has associated therewith a screen means by which the material being conveyed is dewatered. The screen means is preferably provided in the form of a 180° screen.

Still preferably, each second screw conveyor has associated therewith a further screen means by which the material being conveyed is further dewatered. Each further screen means is preferably provided in the form of a 360° screen, each preferably being positioned within a dewatering housing. The dewatering housings are preferably positioned at an end of the second screw conveyors to which the material is conveyed.

The dewatering housing, housings for each of the first screw conveyors and second screw conveyors, and any inspection hatches provided thereon are preferably sealed and able to withstand substantial internal fluid pressures.

In accordance with the present invention there is further provided a method for the passage and conveyance of compressible material, the method comprising the method steps of conveying that material bearing on at least two arrays of first screw conveyors, each array of first screw conveyors conveying laterally to a respective second screw conveyor arranged in transverse relation to its respective array of first screw conveyors, whereby the material does not bear directly on the respective second screw conveyors.

Preferably, the material is conveyed by two arrays of first screw conveyors in substantially opposite directions towards the respective second screw conveyors.

In one form of the present invention the material being conveyed is dewatered as it is conveyed by the second screw conveyors. Preferably, this dewatering is effected by one or more screen means.

BRIEF DESCRIPTION OF THE DRAWINGS

The present invention will now be described, by way of example only, with reference to one embodiment thereof and the accompanying drawings, in which.

BEST MODE(S) FOR CARRYING OUT THE INVENTION

Figure 1:
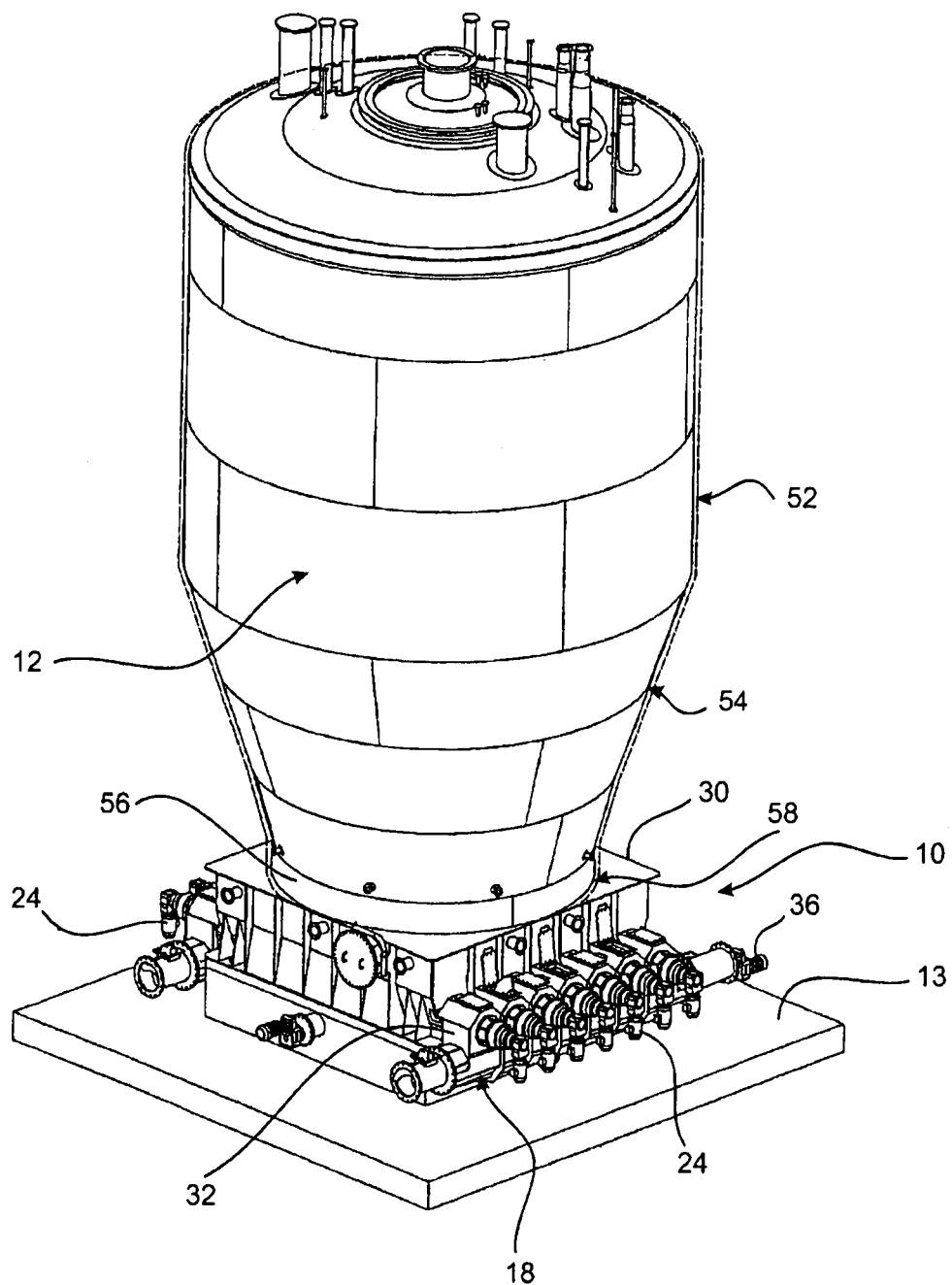
FIG. 1 is an upper perspective view of an apparatus for the passage and conveyance of compressible material in accordance with the present invention, shown in position on a hardstand at the base of a reactor vessel.
Figure 2:
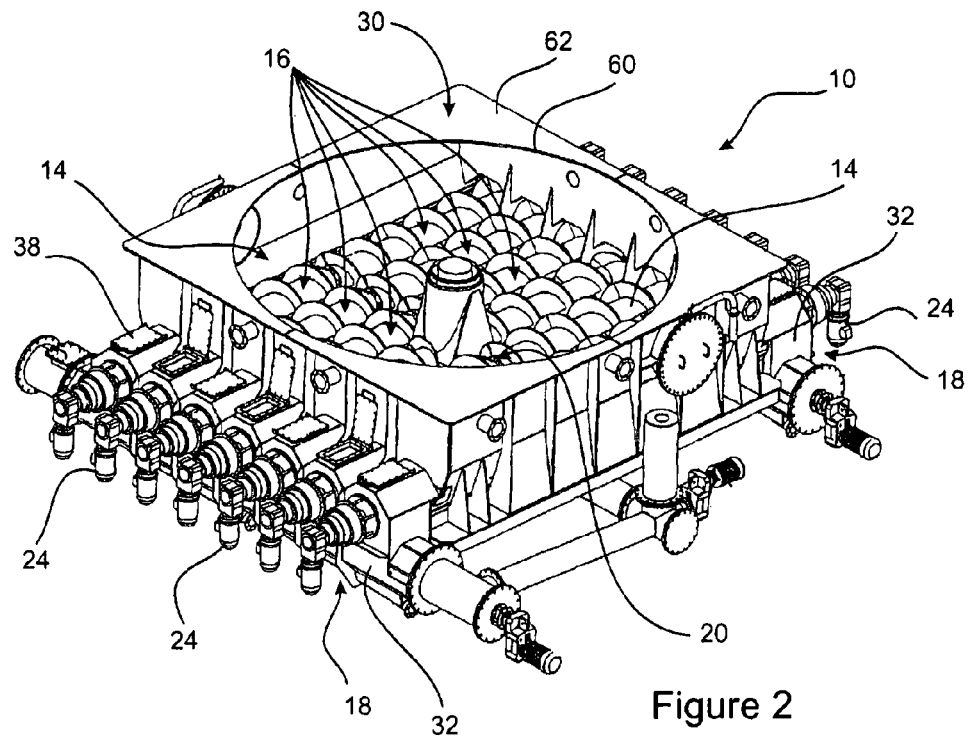
FIG. 2 is an upper perspective view of the apparatus for the passage and conveyance of compressible material of FIG. 1, without the reactor vessel or hardstand of FIG. 1 present.
Figure 3:
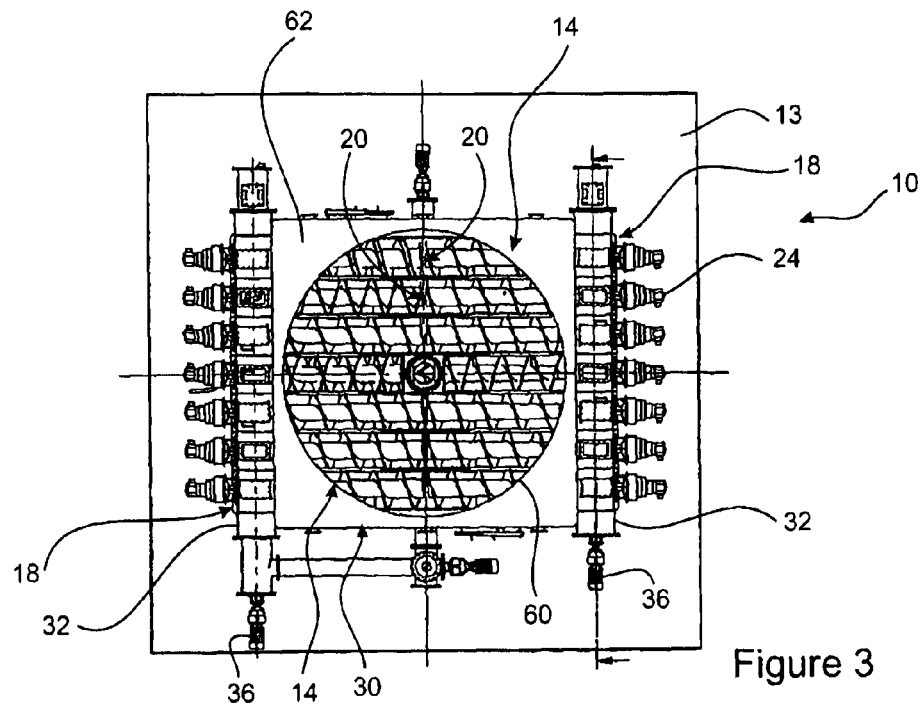
FIG. 3 is a top plan view of the apparatus for the passage and conveyance of compressible material of FIG. 1, without the reactor vessel of FIG. 1 present.

In FIGS. 1 to 5 there is shown an apparatus 10 for the passage and conveyance of compressible material. The apparatus 10 is shown in FIG. 1 with a reactor vessel 12 in position thereon, the apparatus 10 further being provided in position on a hardstand 13.

The apparatus 10 comprises two arrays 14 of first screw conveyors 16, each array 14 arranged to direct material (not shown) conveyed thereby laterally to a side of the apparatus 10, at which point the material drops/is directed onto a second screw conveyor 18 arranged to convey material in transverse relation thereto.

The two arrays 14 of first screw conveyors 16 are arranged so as to generally abut each other at rotatably supported inner ends 20 thereof, and so as to convey material towards outer ends 22 rotatably supported at opposed sides of the apparatus 10. The inner ends 20 of the first screw conveyors 16 are rotatably supported in sealed bearings (not shown). The outer ends 22 of the first screw conveyors 16 are driven by motors 24 provided thereat. Within each array 14 the first screw conveyors 16 are provided as close to their adjacent and parallel first screw conveyors 16 to avoid bridging/coring of the material to be conveyed.

Figure 6:
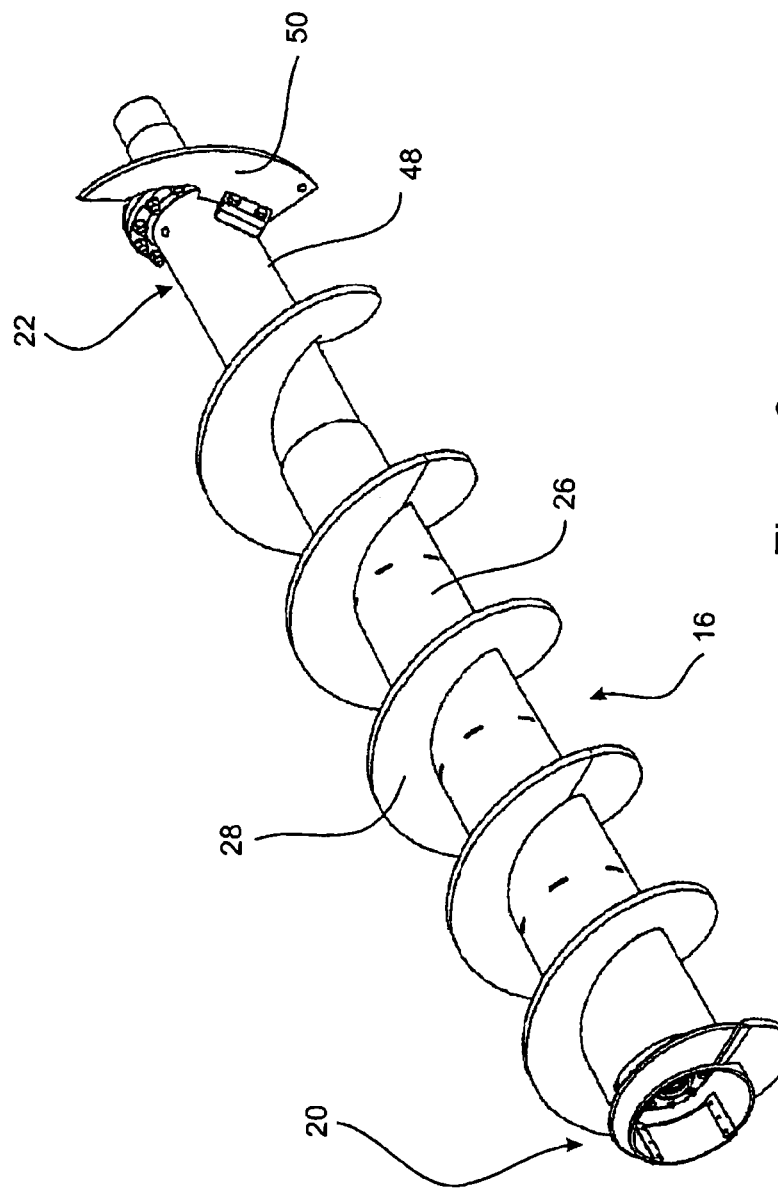
FIG. 6 is an upper perspective view of a first screw conveyor that forms part of an array of such first screw conveyors in the apparatus for the passage and conveyance of compressible material of FIG. 1.

The first screw conveyors 16 further comprise a shaft 26 about which is provided a single helical flight 28. Each shaft 26 is proportioned such that it is of a larger diameter at its inner end 20 than it is at its outer end 22, having a taper therebetween, as is best seen in FIG. 6. The taper may be provided in the form of a smooth taper, as shown in FIG. 6, or, for example, in the form of a stepped cylindrical shaft. The pitch of the flight 28 relative to the shaft 26 increases along the length of the shaft 26 from the inner end 20 to the outer end 22.

Figure 4:
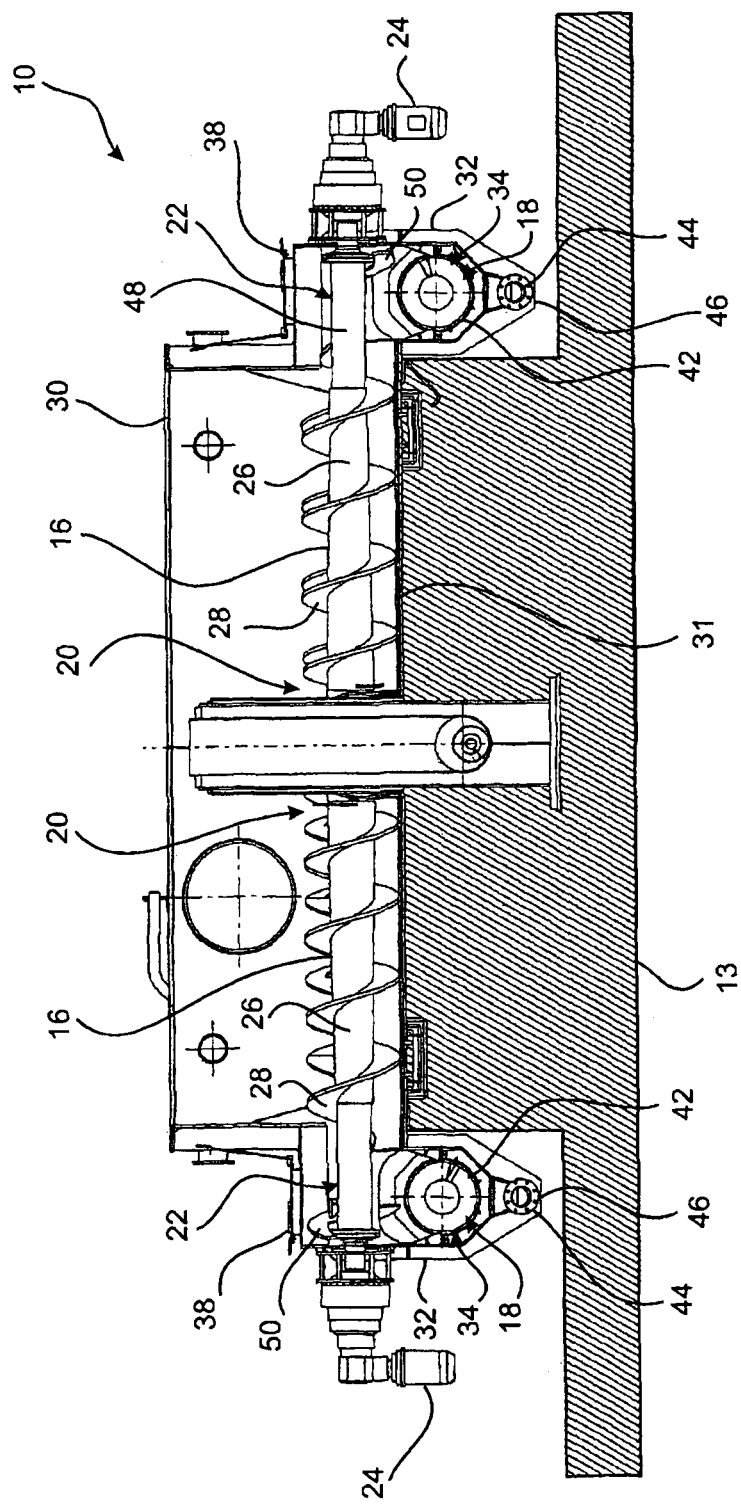
FIG. 4 is an end elevational view of the apparatus for the passage and conveyance of compressible material of FIG. 1, again without the reactor vessel of FIG. 1 present.

The two arrays 14 are arranged so as to sit substantially horizontally in a housing 30 located on the hardstand 13, best seen in FIG. 4. The housing 30 has provided therein a base 31 that bears on the hardstand 13 and directly above which the arrays 14 are positioned. The base 31 is positioned substantially flat and horizontal but may be provided with shallow troughs if desired.

Figure 5:
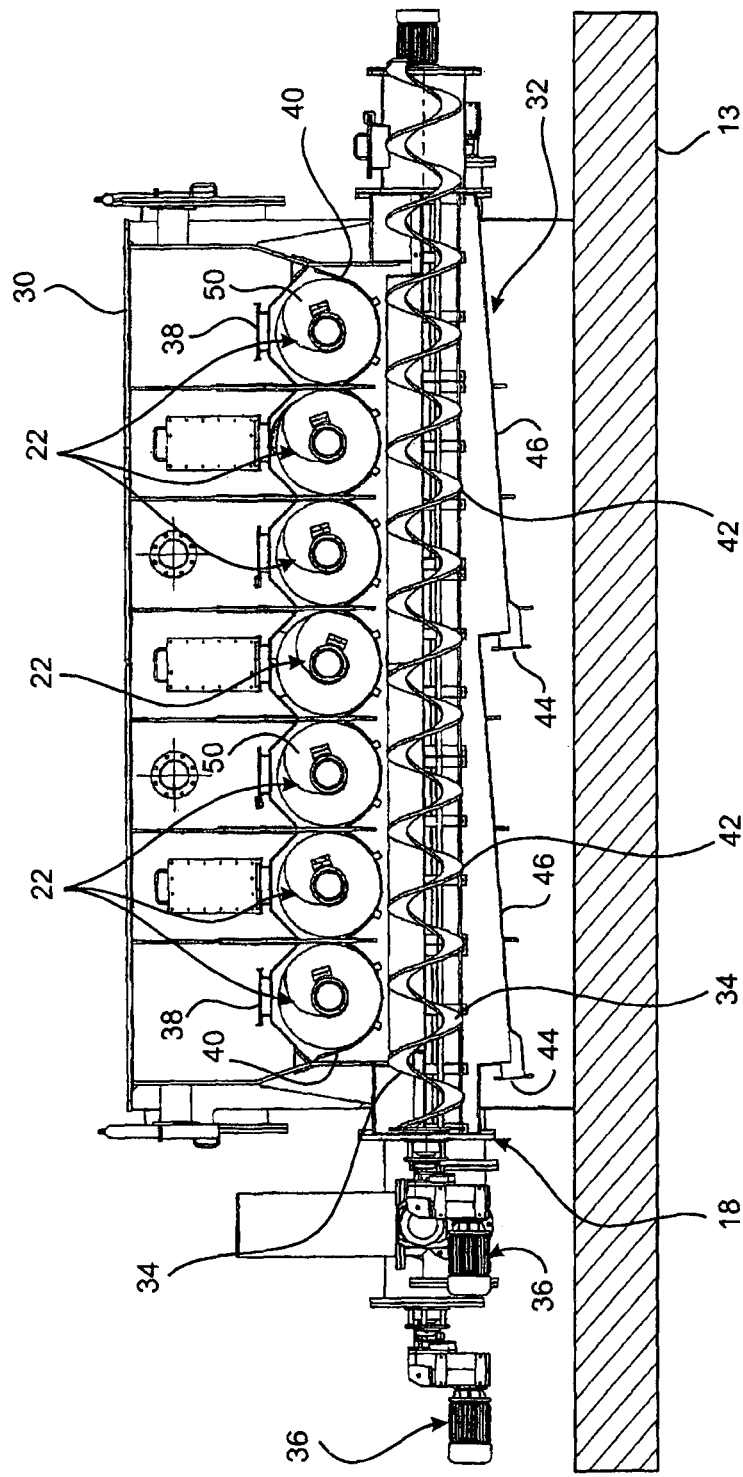
FIG. 5 is a side elevational view of the apparatus for the passage and conveyance of compressible material of FIG. 1, again without the reactor vessel of FIG. 1 present.

Each second screw conveyor 18 is provided in a housing 32 and is provided in the form of a shaftless screw, having a single helical flight 34, best seen in FIG. 5. Each flight 34 is driven by a motor 36. The housings 32 have inspection hatches 38 provided therein, positioned above the outer ends 22 of each first screw conveyor 16. The inspection hatches close in a sealed manner and are able to withstand and operate at substantial internal fluid pressures.

Each second screw conveyor 18 is positioned at a level below that of the first screw conveyors 16, such that material conveyed by the arrays 14 of first screw conveyors 16 falls under gravity to the second screw conveyors 18 in the housings 32 provided at opposed sides of the apparatus 10, which relationship is best seen in FIGS. 4 and 5. The second screw conveyors 18 are rotatably mounted in a sealed manner and are able to withstand and operate at substantial elevated fluid pressures.

The housings 32 have provided therein screen means, for example 180° screens 42. The screens 42 are provided about respective second screw conveyors 18, as is best seen again in FIG. 4. The material being conveyed is able to be dewatered by way of screens 42, with the released water (not shown) passing at least in part to outlets 44 provided in a base 46 of each housing 32.

A dewatering housing 40 is provided at the end of each housing 32. The second screw conveyors 18 extend into the dewatering housings 40 and propel material to be conveyed thereinto. A further screen means, for example a 360° screen 41, is provided within each dewatering housing 40. The combined effect of the 180° screens 42 and the 360° screens 41 is understood to be particularly effective in dewatering the material being conveyed through the respective housings 32 and 40.

The helical flight 28 provided about the shaft 26 of each first screw conveyor 16 terminates towards the outer end 22 thereof and provides a bare outer portion 48 of shaft 26 above the second screw conveyor 18, best seen in FIGS. 4 and 6. An outer partial flight 50 of reverse orientation is provided about the shaft 26 immediately adjacent the rotatable mountings of the outer ends 22, as is again best seen in FIGS. 4 and 6, to help in disengaging retained material from the shaft 26 and preventing same from fouling the rotatable mounting of the outer ends 22.

The reactor vessel 12, best seen in FIG. 1, comprises an upper portion 52 of generally cylindrical form and a lower portion 54 that is provided in the form of an inverted cone, whereby material within the vessel 12 is able to pass under gravity, funnelled into the inverted cone and a circular outlet 56 provided at a base 58 thereof. The circular outlet 56 communicates with a circular aperture 60 provided in an upper surface 62 of the housing 30.

The inverted cone of the lower portion 54 of the vessel 12 describes an angle of between 12° to 20° to the vertical, for example.

To further aid in the passage of the material through the vessel 12 the inner walls of the lower portion 54 are provided with a clear or veil coating of a low friction coating or lining, such as a vinyl ester/acrylic copolymer, for example Corrocoat Polyglass VEF™, on top of, and in addition to, the typical corrosion coating.

The inverted cone of the lower portion 54 of the vessel 12 is such that an arched stress field is formed therein, thereby reducing the load that may be transferred to the apparatus 10 for the passage and conveyance of compressible material. The arched stress field is formed with a radius that centres on an imagined central point of the inverted cone of the lower portion 54 of the vessel 12.

The housings 30, 32 and 40, and the rotating portions of the several conveyors described herein, are pressure sealed. These components can be subjected to significant internal fluids pressure while stationary or during operation. This elevated operating pressure is considerably higher than typical pressures generated by the volume of material above the arrays 14.

In use, when it is desired to move material from the vessel 12 the first and second screw conveyors are operated in an effort to direct material from the base 58 of the vessel 12. The inverted cone of the lower portion 54 of the vessel 12 and the arched or radial stress field formed therein reduces the load on the 'live bottom', being the two arrays 14 of first screw conveyors 16, thereby reducing their propensity to become overloaded in operation.

The provision of the two arrays 14, each spanning about one half of the aperture 60 in the housing 30 and the base 58 of the vessel 12 accomplishes two things. The first being to ensure non-preferential or even flow of material from the vessel 12 to the housing 30 and to the second screw conveyors 18. Secondly, this arrangement ensures that the screw conveyors 16 are not required to convey the material across the full width of that aperture 60, thereby reducing the load to be carried by the motors 24 and 36 relative to the load they would experience had they been required to drive screw conveyors that did extend across that entire width.

The use of the relatively shorter arrays 14 to convey the material from below the aperture 60 and base 58 to the externally located second screw conveyors 18 reduces the potential for choking of the conveyors as a result of the gravitational load of the material acting on those conveyors. This feature is additionally supported by the arched stress field established in the lower portion 54 of the vessel 12, as described hereinabove.

A further feature that contributes to the reduction of load on the 'live bottom' is the ability for the material bearing thereon to move radially outward and into the four corners of the housing 30, thereby reducing stress in that material. In effect, the material 'relaxes' into the additional space available to it. The stress reduction in the material promotes its flowability and at least reduces the possibility of bridging of material above the screw conveyors 16 of the arrays 14. In turn this provides a more reliable apparatus and method for conveying compressible materials.

Still further, the provision of the screw conveyors 16 with tapered shafts 26 and the single helical flight 28 that increases in pitch toward the outer end 22 thereof contributes to the even draw down of material from the lower portion 54 of the vessel 12.

It is envisaged that the drives of the first screw conveyors 16 may be interconnected with devices able to vary the operating speed of the screw conveyors individually and/or as a group of a minimum of two screw conveyors. Speed control devices may be utilised for this purpose and may provide the function by way of a mechanical means, fluid power technology or electrical/electronic means of frequency modulation. Variable speed control provides improved load distribution on individual screw conveyors, or groups of screw conveyors to suit specific circumstances that may be experienced during operation.

Modifications and variations such as would be apparent to the skilled addressee are considered to fall within the scope of the present invention.

The invention claimed is:

1. An apparatus for the passage and conveyance of compressible material, the apparatus comprising at least two arrays of substantially parallel first screw conveyors each arranged at an outlet of a vessel from which the material is to be conveyed such that the material is conveyed to respective second screw conveyors arranged in generally transverse relation thereto, wherein the material to be conveyed bears directly on the first screw conveyors from above and does not bear directly on the second screw conveyors.

2. An apparatus according to claim 1, wherein there are provided two arrays of first screw conveyors arranged to feed material to the respective second screw conveyors.

3. An apparatus according to claim 2, wherein the two arrays of first screw conveyors feed material in substantially opposite directions toward the respective second screw conveyors.

4. An apparatus according to claim 2, wherein the two arrays of first screw conveyors abut at a mid-point of the outlet of the vessel such that each array of first screw conveyors is exposed to about half of the material presenting at the outlet of the vessel.

5. An apparatus according to claim 1, wherein the first screw conveyors each comprise a tapered shaft about which is provided a single helical flight, the shaft tapering towards an outer end thereof.

6. An apparatus according to claim 5, wherein the flight terminates towards the outer end thereof, providing a bare outer portion of the shaft.

7. An apparatus according to claim 5, wherein the helical flight increases in pitch relative to the shaft as it progresses towards the outer end thereof.

8. An apparatus according to claim 5, wherein a partial flight of reverse orientation is provided about the shaft adjacent the outer end thereof.

9. An apparatus according to claim 1, wherein the first and second screw conveyors are sealed and able to withstand and operate at elevated fluid pressures.

10. An apparatus according to claim 1, wherein the vessel from which the material is to be conveyed has an upper portion of generally cylindrical form and a lower portion that is provided in the form of an inverted cone, whereby material therein is funnelled into the inverted cone and a circular outlet provided at a base thereof.

11. An apparatus according to claim 10, wherein the apparatus for the passage and conveyance of compressible material is provided at the base of the inverted cone of the vessel.

12. An apparatus according to claim 10, wherein the inverted cone of the lower portion of the vessel is such that an arched or radial stress field is formed therein, thereby reducing the load that may be transferred to the apparatus for the passage and conveyance of compressible material.

13. An apparatus according to claim 12, wherein the arched or radial stress field is formed with a radius that centres on an imagined central point of the inverted cone of the lower portion of the vessel.

14. An apparatus according to claim 10, wherein the lower portion of the vessel describes an angle of between about 12 to 20° to the vertical.

15. An apparatus according to claim 10, wherein the lower portion of the vessel describes an angle of about 15° to the vertical.

16. An apparatus according to claim 1, wherein the arrays of first screw conveyors are provided in a housing, the housing allowing the material bearing thereon to flow radially into it across the arrays.

17. An apparatus according to claim 1, wherein the screw conveyors have associated therewith one or more screen means by which the material being conveyed is dewatered.

18. An apparatus according to claim 17, wherein each second screw conveyor has associated therewith a screen means by which the material being conveyed is dewatered.

19. An apparatus according to claim 18, wherein the screen means is provided in the form of a 180° screen.

20. An apparatus according to claim 19, wherein each second screw conveyor has associated therewith a further screen means by which the material being conveyed is further dewatered.

21. An apparatus according to claim 20, wherein each further screen means is provided in the form of a 360° screen, each being positioned within a dewatering housing.

22. An apparatus according to claim 21, wherein the dewatering housings are positioned at an end of the second screw conveyors to which the material is conveyed.

23. An apparatus according to claim 21, wherein the dewatering housing, housings for each of the first screw conveyors and second screw conveyors, and any inspection hatches provided thereon are sealed and able to withstand substantial internal fluid pressures.

24. A method for the passage and conveyance of compressible material, the method comprising the method steps of conveying that material bearing on at least two arrays of first screw conveyors, each array of first screw conveyors conveying laterally to a respective second screw conveyor arranged in transverse relation to its respective array of first screw conveyors, whereby the material does not bear directly on the respective second screw conveyors.

25. A method according to claim 24, wherein the material is conveyed by two arrays of first screw conveyors in substantially opposite directions toward the respective second screw conveyors.

26. A method according to claim 24, wherein the material being conveyed is dewatered as it is conveyed by the second screw conveyors.

27. A method according to claim 26, wherein the dewatering is effected by one or more screen means.

* * * * *